No. 684,672. Patented Oct. 15, 1901.
L. CHANDLEE.
MACHINE FOR EXTRACTING PRECIOUS METALS FROM ORES.
(Application filed June 2, 1900.)
(No Model.)
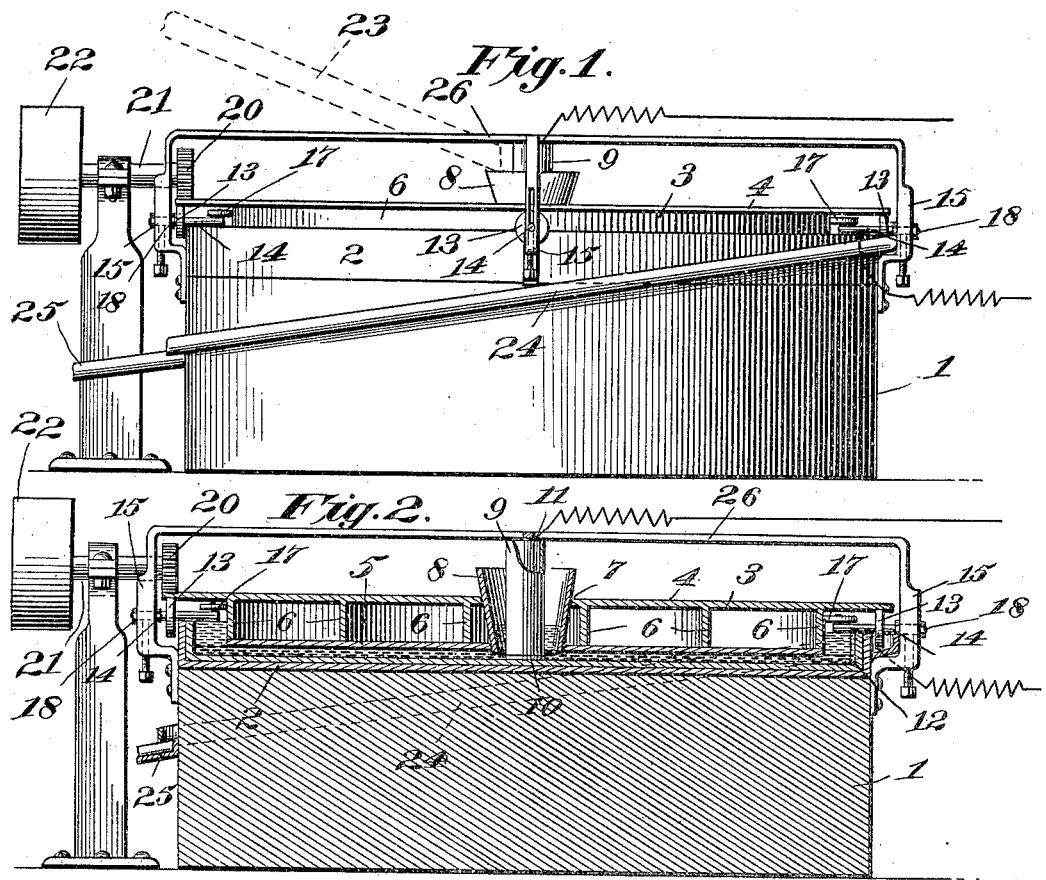
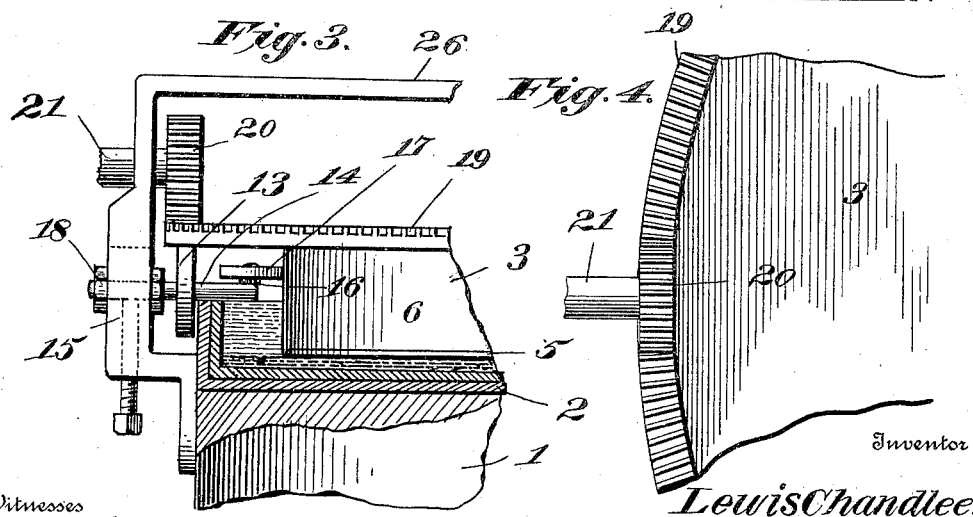
Witnesses
Fenton S. Belt,
Edgar M. Kitchin
Inventor
Lewis Chandlee,
By Mason Fenwick Lawrence his Attorneys
THE NORRIS PETERS CO., PHOTO-LITHO., WASHINGTON, D. C.

UNITED STATES PATENT OFFICE.

LEWIS CHANDLEE, OF COLORADO SPRINGS, COLORADO.

MACHINE FOR EXTRACTING PRECIOUS METALS FROM ORES.

SPECIFICATION forming part of Letters Patent No. 684,672, dated October 15, 1901.

Application filed June 2, 1900. Serial No. 18,922. (No model.)

*To all whom it may concern:*

Be it known that I, LEWIS CHANDLEE, a citizen of the United States, residing at Colorado Springs, in the county of El Paso and State of Colorado, have invented certain new and useful Improvements in Machines for Extracting Precious Metals from Ores; and I do hereby declare the following to be a full, clear, and exact description of the invention, such as will enable others skilled in the art to which it appertains to make and use the same.

My invention relates to improvements in means for extracting gold and other minerals from their ores, and comprises a circular pan and a disk adapted to rotate above the same, the pan and the disk being lined with copper upon their face and surface, the pan being adapted to contain quicksilver, upon which the disk rotates, and means for holding and passing an electric current through the said chemicals and the quicksilver for better extracting the fine or flour minerals from their ores.

It also consists in certain other novel constructions, combinations, and arrangements of parts, as will be hereinafter fully described and claimed.

In the accompanying drawings, forming a part of this specification, Figure 1 represents a side elevation of an ore-treating machine constructed in accordance with my invention. Fig. 2 represents a longitudinal vertical section through the same. Fig. 3 represents an enlarged detail view, in vertical section, of the edge portion of the machine, illustrating the mounting of the disk and the manner of holding it properly in position. Fig. 4 is an enlarged fragmentary view of a portion of the machine, showing the manner of rotating the disk.

The machine which I employ for extracting gold and other minerals from their ores is designed to so hold and keep mercury as to prevent its becoming oxidized and to keep the ore as it passes through the machine in constant motion over the mercury in such a way as to prevent the gold and other metal from passing off with the water which is discharged into the machine with the pulverized ore. In the arrangement of my improved device I mount upon a suitable base 1 a shallow pan, as 2, which may be, for instance, about four feet in diameter and have a rim portion around its outer edge, say, about an inch and a quarter high. The pan is preferably lined with copper, so as to be adapted to hold mercury for amalgamating purposes. Above the pan and arranged so as to rotate close to the surface of the mercury held therein is a revolving disk 3, which is made preferably hollow, having an upper and a lower plate, as 4 and 5, respectively, the said plates being spaced apart by suitable cross-pieces, as 6 6. The space between the plates 4 and 5 is inclosed by peripheral portions, so that mercury cannot get into the interior of the said disk. The upper plate 4 of the disk projects beyond the rim of the pan 2 a sufficient distance to rest upon supporting-rollers or similar mechanism for holding the said disk revolubly in position. The lower plate and the body portion proper of the disk are made of shorter diameter than the pan, so that the said disk will project into the pan and may be brought into engagement with the surface of the mercury carried thereby. The under surface of the said disk is also lined with copper, so that it will be provided with a proper surface to operate in connection with the mercury. The center portion of the disk is provided with an aperture, as at 7, and around the upper edge of the aperture is arranged a hopper, as 8, so that materials delivered into the top of the hopper will be directed to the surface of the mercury between the disk and the pan. The hopper 8 is made sufficiently large to accommodate the anode of an electric circuit. This comprises a porous cup, as 9, closed at the bottom and adapted to hold certain chemicals. The cup 9 is placed in the center of the hopper 8, so as not to touch the same at any point, and rests at its lower end upon a piece of glass or other suitable insulating material, as at 10, so that the porous cup will be insulated from the pan 2, and a circuit passing from the cup to the pan will have to travel through the mercury containing the ore.

One pole of an electric circuit is connected with the porous cup, the end of a wire in the circuit being secured to a lead cylinder, as 11, which is placed in the chemicals contained by the porous cup 9. I place a suitable electrolyte in the porous cup, preferably a composition composed of pure water, sulphate of potash, and fused cyanid of potassium. The lead cylinder is inserted in this mixture. The other pole of the circuit is arranged so as to extend into the mercury held by the pan 2, as at 12. The circuit may be supplied by a suitable dynamo, battery, or other source of electrical energy. The disk 3 is supported at its outer edges upon rollers or wheels, as 13, which are carried by shafts 14, secured to standards 15. There are preferably four or more of these standards carrying wheels for supporting the said disk arranged about the circumference of the machine. The shafts 14 also extend inwardly beyond the wheels 13 and carry at their inner ends vertically-arranged shafts 16, which have mounted upon them horizontally-arranged antifriction rollers or wheels 17, adapted to engage the periphery of the disk 3. By means of the two sets of rollers 13 and 17 the disk is revolubly supported in place above the pan and in such a manner as not to come into contact with the pan itself, but only so as to engage the surface of the mercury held by the pan. The shafts 14 are preferably adjustably secured, as at 18, to the standards 15, so that the supporting rollers or wheels 13 can be arranged to accommodate different quantities of ore between the disk and the surface of the mercury.

In providing a means for rotating the disk 2 I secure a toothed rack, as 19, to the upper surface of the disk 3. Meshing with the said rack for actuating it is a pinion, as 20, mounted upon a shaft 21, which extends inwardly from a point outside the machine. The shaft 21 also carries a belt wheel or pulley 22, by which it may receive power from any suitable power mechanism. (Not shown.) By rotating the shaft 21 the pinion 20 will keep the disk 3 revolving upon its wheels 13, and a centrifugal force will be exerted upon the ore entering the middle of the disk, and the said ore will be gradually worked outwardly upon the surface of the mercury until it reaches the edge of the pan 2. For feeding pulverized ore to the hopper 8 a trough, as 23, may be mounted so that its inner end rests upon the edge of said hopper and will discharge material placed in it in the said hopper between its wall and the wall of the porous cup 9. A sufficient quantity of water is introduced into the chute 23 to carry the powdered ore into the machine. The pulverized ore and water thus discharged will fall upon the mercury in the pan 2 and will be worked out toward the periphery of the pan beneath the said disk until it overflows the edge of the pan. In order to collect the overflow from the edge of the pan, I form a collecting-trough, as 24, upon the base 1, the said trough extending entirely around the said base and projecting out sufficiently far to catch the overflow from the pan. The trough 24 is preferably inclined from one side of the cylindrical base to the other side, and a discharge-trough, as 25, receives the fluid passing off and delivers it at any suitable point.

The porous cup 9 is preferably steadied and braced in position by means of a cross rod or bar 26, which is secured to the upper edge of the said cup and is fastened at its outer end to the upper ends of the standards 15 15. The cup will thus be prevented from being accidentally brought into contact with the disk or the hopper 8. Instead of using a lead cylinder in the porous cup 9 I may employ a copper cylinder plated with platinum, which is connected with the positive pole of a source of electricity. This I find to be about equal to a lead cylinder for the purposes desired. I preferably mix with the mercury in the pan sodium amalgam in about the proportion of one pound of soda amalgam to about from three hundred to four hundred pounds of mercury.

I find in use that this machine is very effective for removing fine or flour gold from pulverized ores and that by the application of electricity to the amalgamating material by means of the insertion of the positive pole of a dynamo or other source of electricity in the chemical jar and attaching the same to the lead cylinder therein and the placing of the negative pole of the said dynamo in the mercury having the amalgam therein an electric circuit is formed and that oxygen is generated at the anode or lead cylinder and hydrogen is generated at the cathode, which keeps the mercury in constant agitation, so as to enable it to take up all the small particles of the precious metal.

Having thus described the invention, what is claimed as new, and desired to be secured by Letters Patent, is—

1. A machine for amalgamating ores, comprising a pan for holding mercury or other amalgamating substances, a disk arranged above the pan and having a downwardly-projecting central portion adapted to extend into the said pan and positively held so as to engage the surface of the mercury, and an outwardly-extending flange adapted to rest upon suitable suporting means, a hopper arranged at the center of the disk and adapted to discharge material through the same upon the surface of the mercury in the pan, a porous cup arranged concentrically within the hopper and adapted to contain suitable chemicals and having its lower end extending below the hopper and inserted in the mercury, means for insulating the cup from the pan, and means for passing a current of electricity through the mercury comprising an anode mounted in the chemical-cup, and a cathode projecting into the mercury in the pan, whereby the current of electricity will pass through the mercury and the material which it carries for keeping it in proper condition to attract and hold the fine metals, substantially as described.

2. A machine for extracting gold or other metals from ore comprising a pan for holding mercury, a disk revolving above the pan and having its lower surface projecting into the mercury-pan, the said disk having a peripheral horizontally-arranged supporting and driving flange, standards secured to the machine and carrying the shafts, supporting rollers or wheels mounted upon the shafts and engaging the said flange on its under face, horizontal antifriction rollers or wheels also carried by the said shafts and adapted to engage the periphery of the disk, whereby the said disk will be held in proper position above the pan so as not to come in contact with the same, a rack secured to the upper surface of the disk, and an actuating-pinion engaging the same, whereby the disk may be kept in continual rotation upon the surface of the mercury, substantially as described.

3. A machine for extracting gold or other metal from ores, comprising a pan mounted upon a suitable standard, mercury carried in the said pan, a disk adapted to be moved on the surface of the mercury comprising upper and lower plates, and spacing cross-pieces, said disk being closed at its periphery, a hopper mounted in the center of the disk, means for supporting the disk at its edge so that it may be revolubly held above the pan, a porous cup mounted in the hopper and resting upon an insulating-block in the pan so that the said cup will engage the mercury but will be insulated from the pan, an anode consisting of a metallic cylinder connected with one of the poles of any source of electricity, the said cylinder being inserted in the porous cup and in chemicals contained therein, a cathode connected with the other pole of the electrical source and extending into the mercury in the pan, and means for revolving the disk, the structure being such that the pulverized material delivered into the hopper will be worked outwardly to the periphery of the pan upon the surface of the mercury, the said mercury being kept in a quick and attracting condition by the electricity passing from the anode to the cathode, and means for collecting the overflow from the pan comprising a trough arranged around the base of the machine, substantially as described.

4. A machine for extracting gold from ores, comprising a base supporting a mercury-pan, standards secured to the said base and extending upwardly outside the pan, a rotatable disk mounted above the pan so as to project into the mercury carried thereby, means upon the standards for rotatably supporting the said disk, a hopper arranged in the center of the disk above the aperture formed therein so as to deliver the ores and water to the surface of the mercury, a porous cup mounted in the hopper and resting upon the insulating-block in the pan, a bar or rod mounted upon the upper end of the standards and secured to the top of the porous cup, whereby the cup is held in a proper position to avoid contact with the hopper or the disk, and a trough for delivering pulverized ores between the hopper and the cup, so that it may be rolled outwardly between the disk and the surface of the mercury.

5. A machine for extracting metals from ores, comprising a pan for containing mercury, a disk revolubly mounted above the pan, so that its under surface will just come in contact with the surface of the mercury, the said pan having a central opening for receiving the ore, means for holding suitable chemicals in the pan, the said means being located in the opening of the disk, and means for passing an electric current through the chemicals and the mercury, whereby oxygen and hydrogen will be evolved for keeping the mercury in an agitated condition and enabling the same to take up the metals more readily, substantially as described.

6. A machine for extracting gold from ores, comprising a pan for holding mercury, a disk revolubly supported above the pan so that its under surface just touches the surface of the mercury, a supporting-flange upon the disk projecting beyond the pan, rollers for supporting and spacing the disk with respect to the pan, and means for adjusting the rollers to different heights for regulating the contact of the disk with the mercury in the pan, substantially as described.

In testimony whereof I hereunto affix my signature in presence of two witnesses.

LEWIS CHANDLEE.

Witnesses:
THOMAS J. BLACK,
ARTHUR COMFORTH.